(12) United States Patent
Guering

(10) Patent No.: US 8,118,259 B2
(45) Date of Patent: Feb. 21, 2012

(54) STORAGE COMPARTMENT FOR THE NOSE GEAR OF AN AIRCRAFT

(75) Inventor: Bernard Guering, Montrabe (FR)

(73) Assignee: Airbus Operations SAS, Toulouse (FR)

( * ) Notice: Subject to any disclaimer, the term of this patent is extended or adjusted under 35 U.S.C. 154(b) by 500 days.

(21) Appl. No.: 12/373,055

(22) PCT Filed: Jun. 28, 2007

(86) PCT No.: PCT/FR2007/001093
§ 371 (c)(1),
(2), (4) Date: Jan. 9, 2009

(87) PCT Pub. No.: WO2008/006956
PCT Pub. Date: Jan. 17, 2008

(65) Prior Publication Data
US 2010/0001129 A1    Jan. 7, 2010

(30) Foreign Application Priority Data
Jul. 12, 2006   (FR) ..................... 06 06344

(51) Int. Cl.
*B64C 1/00* (2006.01)
(52) U.S. Cl. ................. 244/119; 244/100 R; 244/102 R
(58) Field of Classification Search ............. 244/100 R, 244/102 R, 117 R, 119, 120
See application file for complete search history.

(56) References Cited

U.S. PATENT DOCUMENTS

| | | | |
|---|---|---|---|
| 2,021,326 A * | 11/1935 | Payne | 244/102 R |
| 2,138,030 A * | 11/1938 | Giovannoli | 244/102 R |
| 2,982,500 A | 5/1961 | Lucien | |
| 4,408,736 A | 10/1983 | Kirschbaum et al. | |
| 5,482,228 A * | 1/1996 | Hoshino | 244/50 |
| 6,213,428 B1 | 4/2001 | Chaumel et al. | |
| 2008/0011901 A1 | 1/2008 | Guering | |
| 2008/0011905 A1 | 1/2008 | Guering | |
| 2008/0073463 A1 | 3/2008 | Guering | |
| 2008/0179457 A1 | 7/2008 | Guering | |
| 2008/0210813 A1 | 9/2008 | Guering et al. | |

FOREIGN PATENT DOCUMENTS

| | | |
|---|---|---|
| CN | 1248537 A | 3/2000 |
| EP | 0 980 822 | 2/2000 |
| FR | 2 667 042 | 3/1992 |
| GB | 527111 | 10/1940 |
| GB | 530388 | 12/1940 |
| GB | 825 332 | 12/1959 |

OTHER PUBLICATIONS

Office Action issued Aug. 11, 2010 in Chinese Application No. 200780026447.4 (English Translation).
U.S. Appl. No. 12/336,988, filed Dec. 17, 2008, Guering, et al.
U.S. Appl. No. 12/307,965, filed Jan. 8, 2009, Guering.

* cited by examiner

*Primary Examiner* — Timothy D Collins
*Assistant Examiner* — Jamie S Stehle
(74) *Attorney, Agent, or Firm* — Oblon, Spivak, McClelland, Maier & Neustadt, L.L.P.

(57) ABSTRACT

A front landing gear storage compartment for an airplane, which includes a set of retractable landing gears including a front gear centered on a longitudinal median plane of the fuselage. The storage compartment forms an impervious partition between a pressurized zone and the housing for the front gear in its retracted position, and includes a reinforced upper face including a substantially flat zone, which is substantially horizontal when the airplane is on the ground, so as to form a floor of a pressurized area of the airplane.

15 Claims, 2 Drawing Sheets

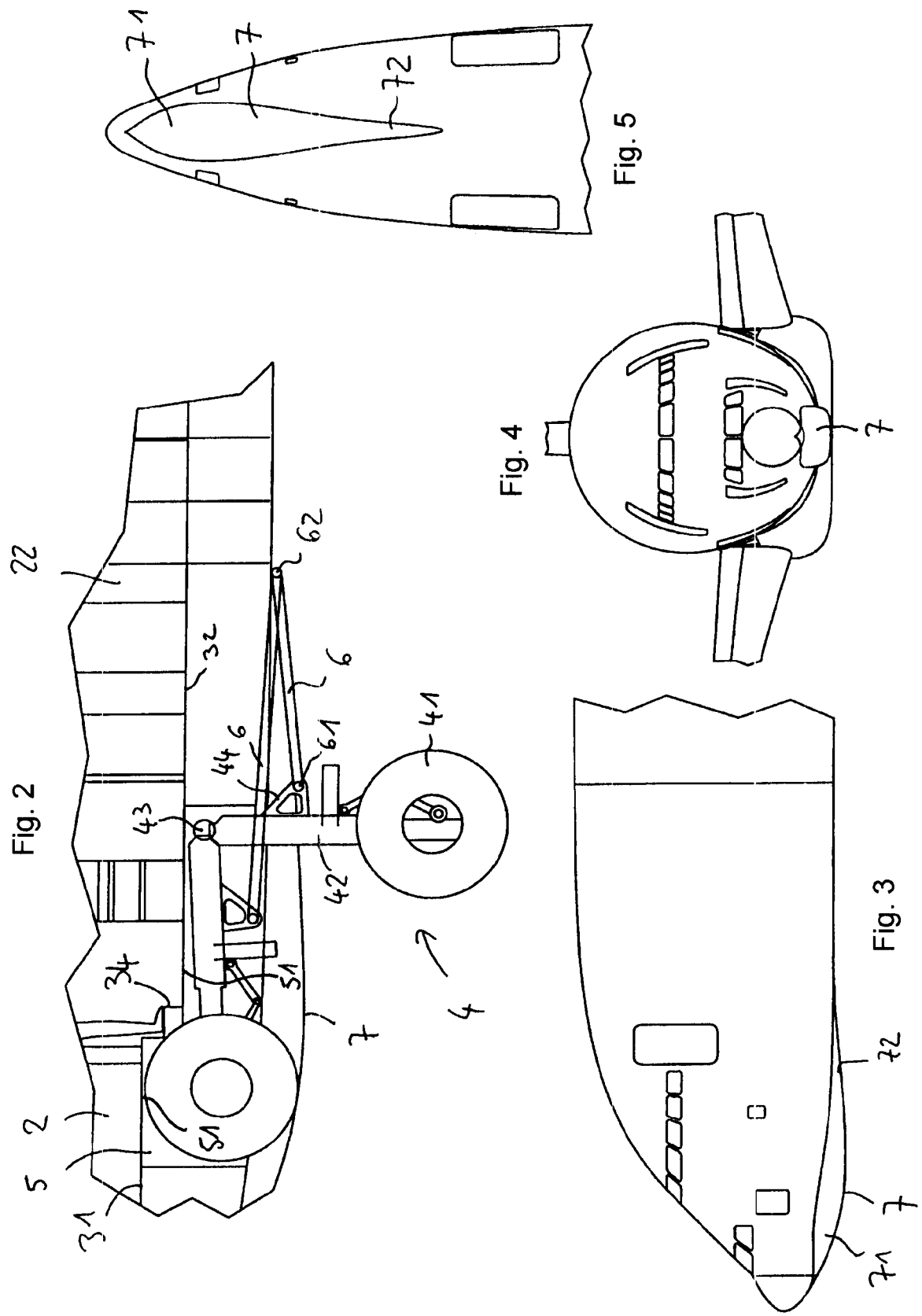

STORAGE COMPARTMENT FOR THE NOSE GEAR OF AN AIRCRAFT

The invention has as its object a storage compartment for the landing gear placed in the front of the fuselage of an airplane, in the longitudinal median plane of the latter.

BACKGROUND

An airplane for transport of passengers and freight usually comprises a single fuselage resting on the ground by means of a set of retractable landing gears, respectively two side gears and a front gear that is centered on a longitudinal median plane of the fuselage.

The fuselage usually is separated into two zones by a floor forming a main deck that extends over its entire length, respectively an upper zone in which a cockpit is laid out, placed in the front tip of the airplane, as well as the cabin for the passengers, and a lower zone that forms a hold for the baggage and varied cargo, this hold extending underneath the main deck, on a lower floor.

Each landing gear is articulated so as to come to be retracted, after takeoff, into a storage compartment that usually is placed under the wings for the side gears and under the front portion of the fuselage for the front central gear. This storage compartment is delimited by a structure that must be strong enough to withstand the stresses applied to the landing gear and it is equipped with flaps opening downward on the lower portion of the fuselage in order to unfold and retract the landing gear, while closing up again after takeoff in order to restore the desired aerodynamic form. It also constitutes the boundary between a pressurized zone inside the aircraft and a non-pressurized space accommodating the landing gear and therefore must be impervious and capable of withstanding the pressure difference between the pressurized space and the inside of the front gear compartment that is not pressurized.

The space around the front gear compartment, laid out underneath the main deck, generally serves as housing for various controls of the airplane. This space, however, is difficult to use because of its complex form, and a significant volume generally is wasted.

SUMMARY

The invention has as its object a new configuration of the front tip of the fuselage making it possible to optimize the layout thereof by virtue of a specific arrangement of the front landing gear and the storage compartment for the latter.

To this end, the invention proposes a front landing gear storage compartment for an airplane comprising a set of retractable landing gears comprising a front gear centered on a longitudinal median plane of the fuselage, this storage compartment forming an impervious partition between a pressurized zone and the housing for the front gear in its retracted position.

According to the invention, this storage compartment has a reinforced upper face comprising a more or less flat zone, more or less horizontal when the airplane is on the ground, so as to form a floor of a pressurized area of the airplane.

By virtue of this innovative design, there is no need to provide a reinforced compartment and a separate floor above the compartment. The upper portion of the compartment then serves as a floor. The controls usually placed around the front gear storage compartment then can find a place, for example, above the floor formed by the upper portion of this compartment. The space freed up in this way certainly is easier to use than the customary space located in the vicinity of a front gear compartment.

In a variant embodiment, the upper face has, for example, also a second more or less flat zone, more or less to the first flat zone, at a lower level. The two flat zones then, for example, are connected by stairs integrated into the reinforced upper face of the storage compartment.

This invention also relates to an aircraft front portion comprising a fuselage, a cockpit laid out in the front of the fuselage and having a floor, as well as a front landing gear and a front landing gear storage compartment, characterized in that the front landing gear storage compartment is a storage compartment such as described above.

In such an aircraft front portion, the upper face of the front landing gear storage compartment advantageously forms at least a part of the floor of the cockpit. There then is no need to provide a reinforced structure for the front landing gear compartment and a reinforced structure forming the floor of the cockpit. This allows the front portion of the aircraft to be made appreciably lighter.

In this front aircraft portion, an aisle for access to the cockpit may be provided, this access aisle having a floor, and this floor advantageously is formed at least in part by the upper face of the front landing gear storage compartment. The floor of the cockpit and the floor of the access aisle may be at different heights, and at least one step integrated into the upper face of the front landing gear compartment then connects the two floors.

One embodiment of the invention provides that the front landing gear comprises an axle mounted at the end of a rigid arm articulated around a cross shaft in the rear portion of the front gear storage compartment and is activated by a mechanism articulated around a shaft placed at the rear of the front landing gear. In this embodiment, the activation mechanism comprises, for example, a jack of variable length, forming a pressure brace having a front end articulated on the arm and a rear end articulated around the cross shaft.

Another variant embodiment provides that the floor of the cockpit comprises two bulging portions placed respectively behind seats intended to accommodate a pilot and a copilot, in which the wheels of the front gear come to be placed in drawn-back position.

An aircraft front portion according to the invention also may comprise a bulb-shaped fairing, arranged below the fuselage, and having a broad front portion in which the wheels come to be placed and continued toward the rear by means of a tapering portion gradually connecting with the fuselage.

According to another variant embodiment, behind the cockpit there is a technical area in which the system controls for the aircraft are placed.

Finally, this invention related to an aircraft, characterized in that it has a front portion such as described above.

BRIEF DESCRIPTION OF THE DRAWINGS

The invention also covers other advantageous characteristics that will come to light in the following description of a specific embodiment, presented by way of non-limitative example and shown on the attached drawings.

FIG. 2 is a detail view, in longitudinal section, of the front gear and its storage compartment.

FIG. 3 is a side view of the airplane according to FIG. 1.

FIG. 4 is a front view of the airplane.

FIG. 5 is a view of the airplane from below.

DETAILED DESCRIPTION

Figure 1:
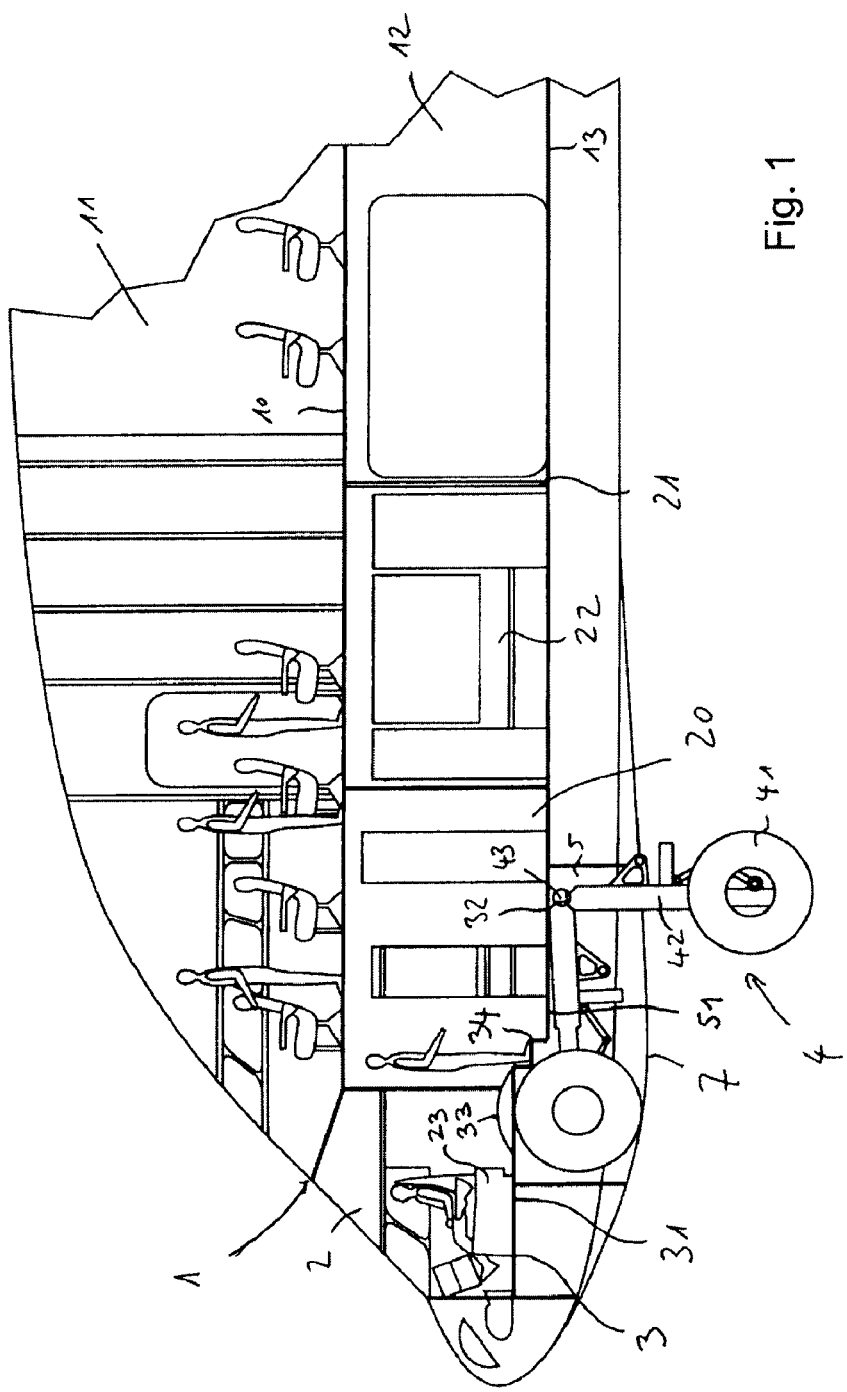
FIG. 1 is a partial view, in longitudinal section, of the front tip of an airplane having a front gear storage compartment according to the invention.

FIG. 1 shows, in longitudinal section, the front portion of the fuselage 1 of an airplane, separated into two zones by a floor 10 forming a main deck, respectively a pressurized and air-conditioned upper zone 11, that forms the passenger cabin, and a pressurized lower zone 12 that constitutes a hold arranged on a lower deck 13.

According to a specific arrangement that will be described in greater detail afterwards, the cockpit 2 is laid out in the front of a pressurized space 20 laid out below the main deck 10 and separated from the hold 12, toward the rear, by an impervious transverse wall 21 having a structure strong enough to form an "anti-crash" wall withstanding possible impacts coming from the hold 12.

The pressurized space 20 is arranged on a floor 3 that comprises a raised front portion 31 on which the cockpit 2 is located and a rear portion 32 placed at a lower level, preferably in the continuation of the lower deck 13 on which the hold 12 is arranged.

As is usual, the airplane rests on two side landing gears, not shown on the Figures, and one central front gear 4 activated by a mechanism shown on FIG. 2, so as to come to be retracted into a storage compartment 5 laid out in the lower portion of the front tip of the fuselage 1.

Generally speaking, the front gear 4 comprises an axle with two sets of wheels 41 laid out on both sides of the end of a support arm 42 that is articulated, at its other end, around a cross shaft 43 so as to be able to pivot between the landing position for which the arm 42 is more or less vertical and the position retracted into the storage compartment 5, for which the arm 42 is more or less horizontal.

To this end, the movement of the arm 42 is controlled by a mechanism essentially comprising a pressure brace 6 made up of one or more telescopic jacks extending toward the rear and having a front end articulated around a shaft 61 on a support part 44 of the arm 42 and a rear end articulated on the fuselage around a shaft 62.

Of course, the mechanism as a whole must be capable of withstanding extremely great stresses, in particular upon landing. The storage compartment 5 arranged in the lower portion of the fuselage therefore must have a structure strong enough to withstand the stresses sustained, in particular at the bearings on which the hinge pins 43 of the support arm 42 and 62 of the pressure brace 6 are mounted.

According to the invention, the storage compartment 5 is placed directly underneath the floor 3 of the cockpit 2. The rear portion 32 of the floor constitutes in part the upper wall 51 of the structure of the storage compartment 5 while the rest of the upper wall 51 of the structure of the storage compartment forms a part of the front portion 31 of the floor 3 as well as stairs 34 connecting the front portion 31 to the rear portion 32.

Furthermore, according to a variant of the invention, because the storage compartment 5 is placed directly underneath the floor of the cockpit 2, items of equipment, in particular electronic, assembled within an avionic bay, are placed in a technical area 22 laid out in the pressurized space 20, at the rear of the cockpit 2.

In this way, all these items of equipment remain accessible in flight.

As the storage compartment 5 thus is integrated into the fuselage underneath the cockpit 2, it is possible that its height might be insufficient for retracting the entire gear, and particularly the wheels, therein.

Advantageously the floor 31 of the cockpit may comprise two bulging portions 33 arranged respectively behind two armchairs 23 for the pilots and in which a portion of the two sets of wheels 41 come to be placed in drawn-back position.

Moreover, the storage compartment 5 shown on the Figures comprises in its lower portion a fairing 7 having a bulb shape shown on FIGS. 3, 4 and 5, with a broad front portion 71 in which the wheels 41 come to be placed, and a tapering rear portion 72 that, in its median portion, encompasses the hinge pin 62 of the brace 6 and ends in a point to connect with the fuselage.

The relative proportions between the part of the storage compartment 5 integrated into the fuselage 1 and its lower part at the fairing 7 are determined so that the bulb-shaped fairing 7 constitutes a compromise between the comfort requirement for the crew that sets a maximum height for the front portion 31 of the floor 3 of the cockpit and a maximum height of the fairing 7 to maintain an acceptable aerodynamic drag.

Of course, the fairing 7 is made up of at least two flaps that open to allow operation of the landing gear and close up again in flight.

The storage compartment 5 for the front gear 4 according to the invention may be adopted on airplanes with a standard configuration in which the cockpit is located on the same level as a passenger cabin on a main deck and in the front of this passenger cabin. The invention is well suited, however, to a configuration in which the cockpit is placed in the low portion of the fuselage. In this specific embodiment shown on FIG. 1, the cockpit 2 is placed in the front of the pressurized space 20 that extends toward the rear, underneath the main deck 10, and therefore is located on the same level as the hold 12. The passenger cabin then may extend up to the front end of the main deck 10. At this end, passengers then may be seated in the place usually occupied by the pilots.

The pressurized space 20, isolated from the passenger cabin placed in the upper zone 11, may be reserved for the crew and also comprises, for example, in addition to the technical area 22 referred to above, a relaxation area for the crew. This relaxation area advantageously is traversed by a central longitudinal aisle. The floor of this longitudinal aisle then corresponds to the upper face of the front landing gear storage compartment. The upper face of this compartment then serves here as a floor, at least in part, for the cockpit, and as a floor for the longitudinal aisle for access to the cockpit and to the relaxation area for the crew. This area comprises, for example, a lounge equipped with a berth on each side of the aisle as well as at least one lavatory and possibly a shower.

The invention, however, obviously is not limited to the details of this embodiment, but also covers variants using equivalent means.

The invention claimed is:

1. A front landing gear storage compartment for an airplane comprising:
   a set of retractable landing gears comprising a front landing gear centered on a longitudinal median plane of the fuselage, the storage compartment forming an impervious partition between a pressurized zone and a housing for the front landing gear in its retracted position; and
   a reinforced upper face comprising a first substantially flat zone which is substantially horizontal when the airplane is on the ground, so as to form a first floor for a pressurized area of the airplane, wherein
the first floor of the pressurized area of the airplane comprises two bulging portions placed respectively behind seats configured to accommodate a pilot and a copilot, in which wheels of the front landing gear come to be placed in a drawn-back position.

2. A front landing gear storage compartment according to claim 1, wherein the reinforced upper face has a second substantially flat zone which is at a lower level than the first flat zone so as to form a second floor for a pressurized area of the airplane.

3. A front landing gear storage compartment according to claim 2, wherein the first and second flat zones are connected by stairs integrated into the reinforced upper face of the storage compartment so that the first and second floors are joined by the stairs.

4. A front landing gear storage compartment according to claim 3, wherein the stairs follow a contour of the wheels of the front landing gear when the front landing gear is in the retracted position.

5. A front landing gear storage compartment according to claim 3, wherein, when the front landing gear is in the retracted position, a support arm of the front landing gear which extends to an axis of the wheels is substantially horizontal and parallel with the second floor, and the wheels of the front landing gear are proximate to the first floor.

6. An aircraft front portion comprising:
a fuselage;
a cockpit laid out in a front of the fuselage and including a floor;
a front landing gear centered on a longitudinal median plane of the fuselage;
a front landing gear storage compartment which forms an impervious partition between a pressurized area of the airplane and a housing for the front landing gear in its retracted position; and
a reinforced upper face of the front landing gear storage compartment which has a substantially flat zone which is substantially horizontal when the airplane is on the ground so as to form a floor of a pressurized area of the airplane, wherein
the floor of the cockpit comprises two bulging portions placed respectively behind seats configured to accommodate a pilot and a copilot, in which wheels of the front landing gear come to be placed in a drawn-back position.

7. An aircraft front portion according to claim 6, wherein the reinforced upper face of the front landing gear storage compartment forms at least a part of the floor of the cockpit.

8. An aircraft front portion according to claim 7, further comprising an access aisle for access to the cockpit, wherein the access aisle includes a floor, and the floor of the access aisle is formed, at least in part, by the reinforced upper face of the front landing gear storage compartment.

9. An aircraft front portion according to claim 8, wherein the floor of the cockpit and the floor of the access aisle are at different heights, and wherein at least one step integrated into the reinforced upper face of the front landing gear compartment connects the floors.

10. An aircraft front portion according to claim 9, wherein the at least one step integrated into the reinforced upper face of the front landing gear compartment connecting the two floors follows a contour of the wheels of the front landing gear when the front landing gear is in the retracted position.

11. An aircraft front portion according to claim 6, wherein the front landing gear comprises an axle mounted at the end of a rigid arm articulated around a cross shaft in the rear portion of the front landing gear storage compartment and that is activated by an activation mechanism articulated around a shaft placed at the rear of the front landing gear.

12. An aircraft front portion according to claim 11, wherein the activation mechanism comprises a jack of variable length, forming a pressure brace comprising a front end articulated on the arm and a rear end articulated around the cross shaft.

13. An aircraft front portion according to claim 6, further comprising a bulb-shaped fairing, arranged underneath the fuselage, and comprising a broad front portion in which the wheels of the front landing gear come to be placed and continued toward the rear by a tapering portion gradually connecting with the fuselage.

14. An aircraft front portion according to claim 6, further comprising a technical area in which the system controls for the aircraft are placed behind the cockpit.

15. An aircraft, comprising a front portion according to claim 6.

* * * * *